(12) United States Patent
Okaji et al.

(10) Patent No.: US 11,618,430 B2
(45) Date of Patent: Apr. 4, 2023

(54) VEHICLE DRIVING APPARATUS

(71) Applicant: Honda Motor Co., Ltd., Tokyo (JP)

(72) Inventors: Tomoya Okaji, Tokyo (JP); Kota Inoue, Tokyo (JP); Satoshi Motozawa, Tokyo (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 17/584,261

(22) Filed: Jan. 25, 2022

(65) Prior Publication Data
US 2022/0242220 A1    Aug. 4, 2022

(30) Foreign Application Priority Data

Feb. 1, 2021 (JP) .............................. JP2021-014169

(51) Int. Cl.
| | | |
|---|---|---|
| *B60W 10/30* | (2006.01) | |
| *B60W 20/10* | (2016.01) | |
| *B60W 20/20* | (2016.01) | |
| *B60W 20/40* | (2016.01) | |
| *B60W 10/02* | (2006.01) | |
| *B60W 10/06* | (2006.01) | |
| *B60W 10/08* | (2006.01) | |

(52) U.S. Cl.
CPC ............ *B60W 20/10* (2013.01); *B60W 10/30* (2013.01); *B60W 20/20* (2013.01); *B60W 20/40* (2013.01); *B60W 10/023* (2013.01); *B60W 10/06* (2013.01); *B60W 10/08* (2013.01); *B60W 2520/266* (2013.01); *B60W 2710/30* (2013.01)

(58) Field of Classification Search
CPC .... B60W 20/20; B60W 10/023; B60W 10/06; B60W 10/08; B60W 2520/266; B60W 2710/30; B60W 10/30; B60W 20/10; B60W 20/15; B60K 6/442; B60K 6/387; F16H 57/0439
USPC .............................................. 477/5
See application file for complete search history.

(56) References Cited

U.S. PATENT DOCUMENTS

| | | | |
|---|---|---|---|
| 2017/0101085 A1* | 4/2017 | Yoon | B60W 10/113 |
| 2018/0045090 A1* | 2/2018 | Kiyokami | B60W 30/1843 |
| 2019/0285165 A1* | 9/2019 | Hashimoto | B60W 20/10 |

FOREIGN PATENT DOCUMENTS

| | | | |
|---|---|---|---|
| CN | 114953959 A | * | 8/2022 |
| JP | 2012091708 A | | 5/2012 |

* cited by examiner

*Primary Examiner* — Roger L Pang
(74) *Attorney, Agent, or Firm* — Duft & Bornsen, PC

(57) ABSTRACT

A vehicle driving apparatus including a first oil pump driven by an internal combustion engine; a second oil pump connected to a torque transmission portion transmitting a driving force of the second motor generator to a drive wheel; a hydraulic circuit configured so that a lubricating oil is supplied from the second oil pump to a lubrication portion in a first mode in which a vehicle travels while stopping the internal combustion engine, and the lubricating oil is supplied from the first and second oil pumps to the lubrication portion in a second mode in which the vehicle travels while driving the internal combustion engine; a slip detector detecting a slip state of the drive wheel, and a control unit switching to the second mode when the slip state is detected during the first mode.

9 Claims, 3 Drawing Sheets

VEHICLE DRIVING APPARATUS

CROSS-REFERENCE TO RELATED APPLICATION

This application is based upon and claims the benefit of priority from Japanese Patent Application No. 2021-014169 filed on Feb. 1, 2021, the content of which is incorporated herein by reference.

BACKGROUND OF THE INVENTION

Field of the Invention

This invention relates to a vehicle driving apparatus for driving a vehicle.

Description of the Related Art

As this type of apparatus, there has been conventionally known an apparatus which includes an engine, a first electric motor for power generation, and a second electric motor for traveling, and is configured to transmit torque of the engine to an axle via a first transmission path and transmit torque of the second electric motor to the axle via a second transmission path. Such an apparatus is described, for example, in Japanese Unexamined Patent Publication No. 2012-091708 (JP2012-091708A). In the apparatus described in JP2012-091708A, the torque transmission path is switched by switching a clutch, and either engine traveling by the torque of the engine or motor traveling by the torque of the second electric motor is realized.

In a vehicle having the apparatus capable of realizing the engine traveling and the motor traveling as described in JP2012-091708A, an oil pump driven by rotation of an output shaft of the engine and an oil pump driven by rotation of another rotation element may be provided. In such a vehicle, there is a concern that the amount of oil supplied to a portion requiring lubrication is insufficient during the motor traveling in which the engine is stopped.

SUMMARY OF THE INVENTION

An aspect of the present invention is a vehicle driving apparatus, including: an internal combustion engine; a first motor generator driven by the internal combustion engine; a second motor generator; a torque transmission portion configured to form a torque transmission path so that a driving force of the second motor generator is transmitted to a drive wheel via a differential mechanism; an electronic control unit configured to control the internal combustion engine, the first motor generator and the second motor generator so as to switch a traveling mode to a first mode in which a vehicle travels while stopping the internal combustion engine or a second mode in which the vehicle travels while driving the internal combustion engine; a first oil pump driven by the internal combustion engine; a second oil pump connected to the torque transmission portion; a hydraulic circuit configured so that when the traveling mode is the first mode, a lubricating oil is supplied from the second oil pump to a lubrication portion requiring a lubrication, and when the traveling mode is the second mode, the lubricating oil is supplied from both the first oil pump and the second oil pump to the lubrication portion; and a slip detector configured to detect a slip state of the drive wheel. The lubrication portion includes the differential mechanism, and the electronic control unit is configured to switch the traveling mode to the second mode when the slip state is detected by the slip detector in the first mode.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
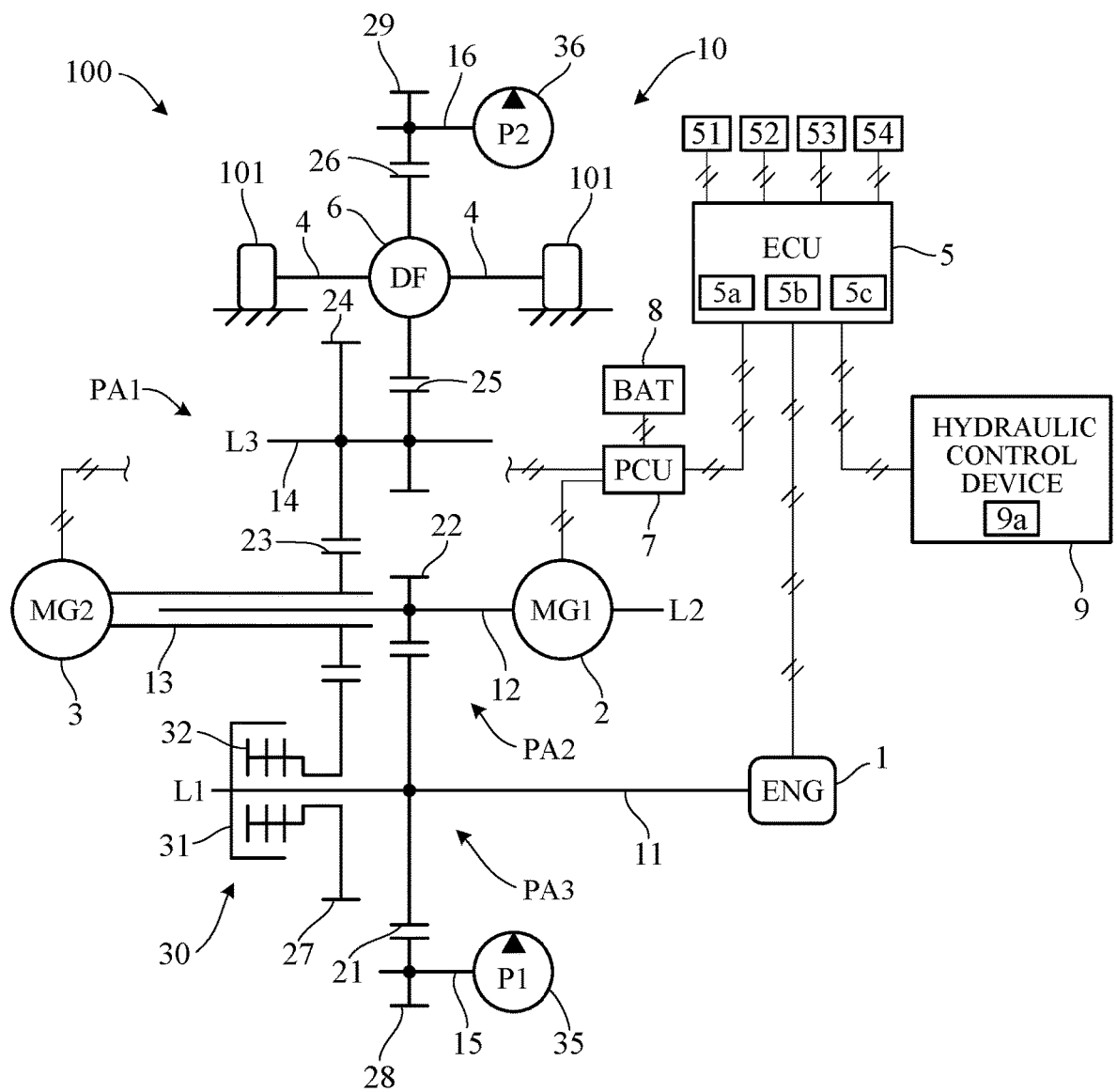
FIG. 1 is a diagram schematically illustrating an overall configuration of a vehicle driving apparatus according to an embodiment of the present invention.

Hereinafter, an embodiment of the present invention will be described with reference to FIGS. 1 to 5. A vehicle driving apparatus according to an embodiment of the present invention is applied to a hybrid vehicle including an engine and a motor generator as traveling driving sources. FIG. 1 is a diagram schematically illustrating an overall configuration of a vehicle driving apparatus 100 according to this embodiment.

As illustrated in FIG. 1, the vehicle driving apparatus 100 includes an engine (ENG) 1 and first and second motor generators (MG1, MG2) 2 and 3 as driving sources, and a gear mechanism 10 interposed between the driving sources and a differential mechanism 6 to transmit torque generated by the driving sources to right and left axles 4 via the differential mechanism (DF) 6.

The vehicle driving apparatus 100 includes a plurality of rotary shafts parallel to the axle 4. That is, the vehicle driving apparatus 100 includes a rotary shaft (output shaft) 11 extending along a first axis L1 parallel to the axle 4 and connected to the engine 1, a rotary shaft 12 and a rotary shaft 13 extending along a second axis L2 parallel to the axle 4 and connected to the first motor generator 2 and the second motor generator 3, respectively, and a rotary shaft (intermediate shaft) 14 extending along a third axis L3 parallel to the axle 4.

The engine 1 is an internal combustion engine (for example, a gasoline engine) that mixes intake air supplied via a throttle valve and fuel injected from an injector at an appropriate ratio, and ignites the mixture by an ignition plug or the like to burn the mixture, and thus to generate rotational power. Incidentally, various engines such as a diesel engine can be used instead of the gasoline engine. The opening degree of the throttle valve, an amount of fuel injected from the injector (injection period, injection time), an ignition period, and the like are controlled by a controller (ECU) 5. The driving force generated by the engine 1 is output via the rotary shaft 11.

Each of the first and second motor generators 2 and 3 includes a rotor that rotates about the second axis L2, and a substantially cylindrical stator arranged around the rotor. More specifically, the rotor of the first motor generator 2 is supported to be rotatable about the second axis L2, is connected to the rotary shaft 12, and rotates integrally with the rotary shaft 12. On the other hand, the rotor of the second motor generator 3 is formed in a substantially cylindrical shape centered on the second axis L2. The rotor is supported to be rotatable about the second axis L2, is connected to the substantially cylindrical rotary shaft 13, and rotates integrally with the rotary shaft 13.

The first and second motor generators 2 and 3 can function as motors and generators. That is, the rotors of the first and second motor generators 2 and 3 are driven by power supplied from a battery (BAT) 8 to the coil of the stator via a power control unit (PCU) 7. At this time, the first and second motor generators 2 and 3 function as motors. On the other hand, when the rotary shafts 12 and 13 of the rotors of the first and second motor generators 2 and 3 are driven by an external force, the first and second motor generators 2 and 3 generate power, and the power is stored in the battery 8 via the power control unit 7. At this time, the first and second motor generators 2 and 3 function as generators.

During normal traveling, for example, constant speed traveling or acceleration traveling, the first motor generator 2 mainly functions as a generator, and the second motor generator 3 mainly functions as a motor. More specifically, the first motor generator 2 functions as a motor that rotationally drives a crankshaft integrated with the rotary shaft 11 at the time of starting the engine, and functions as a generator otherwise. The second motor generator 3 functions as a generator in order to obtain regenerative energy during deceleration traveling, and functions as a motor otherwise.

The power control unit 7 includes an inverter. When the inverter is controlled by a command from the controller 5, the output torque or the regenerative torque of each of the first motor generator 2 and the second motor generator 3 is controlled.

A clutch mechanism 30 is provided around the rotary shaft 11. The clutch mechanism 30 is a wet multi-plate hydraulic clutch that includes a clutch plate 31 provided integrally with the rotary shaft 11 and rotating integrally with the rotary shaft 11, and a clutch plate 32 provided to be engageable with and disengageable from the clutch plate 31, and is operated by a hydraulic force. That is, the hydraulic force acts on the clutch plate 32 in accordance with switching of a control valve (not illustrated), whereby the clutch plate 32 is engaged with the clutch plate 31, and power is transmitted from the rotary shaft 11 to the clutch plate 32 (clutch engagement state). On the other hand, when the action of the hydraulic force on the clutch plate 32 is stopped, the clutch plate 32 is disengaged from the clutch plate 31, and the transmission of the power from the rotary shaft 11 to the clutch plate 32 is cut off (clutch release state).

The gear mechanism 10 includes a gear 21 provided integrally with the rotary shaft 11, a gear 22 provided integrally with the rotary shaft 12, a gear 23 provided integrally with the rotary shaft 13, gears 24 and 25 provided integrally with the rotary shaft 14, a gear 26 provided integrally with the differential mechanism 6, and a gear 27 provided integrally with the clutch plate 32.

The gear 22 of the rotary shaft 12 is meshed with the gear 21 of the rotary shaft 11. Accordingly, the torque of the engine 1 is transmitted to the rotary shaft 12 via the gear 21 and the gear 22, and the first motor generator 2 is driven. As a result, the first motor generator 2 can generate power.

The gear 24 of the rotary shaft 13 is meshed with the gear 23 of the rotary shaft 14, and the gear 26 of the differential mechanism 6 is meshed with the gear 25 of the rotary shaft 14. Accordingly, the torque of the second motor generator 3 is transmitted to the differential mechanism 6 via the gear 23, the gear 24, the rotary shaft 14, the gear 25, and the gear 26. As a result, the axle 4 is driven, and a drive wheel 101 rotates. Incidentally, a torque transmission path from the second motor generator 3 to the axle 4 is referred to as a first torque transmission path PA1.

The gear 27 of the clutch mechanism 30 is further meshed with the gear 23 of the rotary shaft 13. Accordingly, during clutch engagement, the torque of the engine 1 is transmitted to the differential mechanism 6 via the clutch mechanism 30, the gear 27, the gear 23, the gear 24, the rotary shaft 14, the gear 25, and the gear 26. As a result, the axle 4 is driven by the torque from the engine 1. When the clutch is released, the torque transmission from the engine 1 to the gear 27 is cut off. Incidentally, a torque transmission path from the engine 1 to the axle 4 is referred to as a second torque transmission path PA2. The second torque transmission path PA2 is configured by connecting a torque transmission path PA3 from the engine 1 to the gear 23 via the clutch mechanism 30 and the first torque transmission path PA1 in series.

A hydraulic control device 9 includes a control valve 9a such as an electromagnetic valve or an electromagnetic proportional valve operated by an electric signal. The control valve 9a operates in response to a command from the controller 5 and controls the flow of a pressure oil to the clutch mechanism 30. Accordingly, the engagement (On) and release (Off) of the clutch mechanism 30 can be switched. Incidentally, the flow of the pressure oil to other parts is controlled by other control valves of the hydraulic control device 9.

The controller 5 is an electronic control unit which includes an arithmetic processing unit including a CPU, a ROM, a RAM, other peripheral circuits, and the like, and includes an engine control ECU 5a for controlling the engine 1, a clutch ECU 5b for controlling the engagement (On) and release (Off) of the clutch mechanism 30, and a motor generator control ECU 5c for controlling the first and second motor generators 2 and 3. Incidentally, the single controller 5 may not include the plurality of ECUs 5a to 5c, but a plurality of controllers 5 may be provided corresponding to the ECUs 5a to 5c.

Signals from a vehicle speed sensor 51 that detects a vehicle speed, an accelerator opening sensor 52 that detects an accelerator opening degree according to an operation amount of an accelerator pedal, an SOC sensor 53 that detects a charging rate (state of charge) of the battery 8, and a rotation speed sensor 54 that detects rotation speeds of the right and left drive wheels 101 are input to the controller 5. Incidentally, although not illustrated, signals from a rotation speed sensor that detects the rotation speed of the engine 1, a rotation speed sensor that detects the rotation speed of the first motor generator 2, a rotation speed sensor that detects the rotation speed of the second motor generator 3, and the like are also input to the controller 5.

On the basis of these input signals, the controller 5 determines a traveling mode in accordance with a driving force map indicating a driving force characteristic of the vehicle defined from a predetermined vehicle speed, accelerator opening degree, and the like while considering the charging rate of the battery 8. Further, a control signal is output to a throttle valve opening adjusting actuator, a fuel injection injector, the power control unit 7, the hydraulic control device 9 (control valve 9a), and the like to control the operations of the engine 1, the first and second motor generators 2 and 3, and the clutch mechanism 30 so that the vehicle travels according to the traveling mode.

The vehicle driving apparatus 100 according to this embodiment is configured to be able to switch the traveling mode. The traveling mode that can be realized by the vehicle driving apparatus 100 includes an EV mode in which the vehicle travels by driving of the second motor generator 3, a power generation mode in which the vehicle travels by driving of the second motor generator 3 while generating power by the first motor generator 2, and a cruising mode in which the vehicle travels by driving of the engine 1.

In the EV mode, the driving of the engine 1 is stopped, and the clutch mechanism 30 is turned off. At this time, the torque of the second motor generator 3 is transmitted to the axle 4 via the gear mechanism 10, whereby the vehicle can travel by the torque of the second motor generator 3.

In the power generation mode, the engine 1 is driven while the clutch mechanism 30 is turned off. Therefore, the first motor generator 2 is driven to generate power. On the other hand, the second motor generator 3 is driven using the electric power generated by the first motor generator 2, whereby the vehicle is driven to travel.

In the cruising mode, the engine 1 is driven, and the clutch mechanism 30 is turned on. The cruising mode is a mode suitable for a case where the vehicle cruises at a high vehicle speed, and the torque of the engine 1 is transmitted to the axle 4 via the clutch mechanism 30 and the gear mechanism 10, whereby the vehicle can travel by the torque of the engine 1.

A configuration of a hydraulic circuit provided in the vehicle driving apparatus 100 will be described. As illustrated in FIG. 1, a gear 28 is meshed with the gear 21 of the output shaft 11 of the engine 1. A rotary shaft (input shaft) 15 of a first oil pump (P1) 35 is connected to the gear 28. Accordingly, when the engine 1 operates, the first oil pump 35 is driven via the gear 21 and the gear 28, and an oil is discharged from the first oil pump 35. A gear 29 is meshed with the gear 26 of the differential mechanism 6. A rotary shaft (input shaft) 16 of a second oil pump (P2) 36 is connected to the gear 29. Accordingly, when the axle 4 rotates, the second oil pump 36 is driven via the gear 26 and the gear 29, and an oil is discharged from the second oil pump 36.

Figure 2:
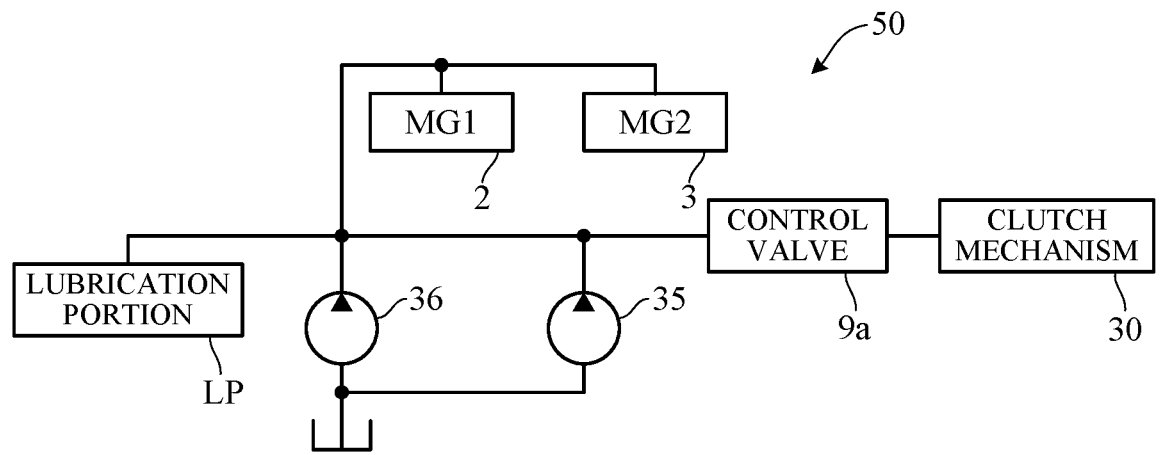
FIG. 2 is a hydraulic circuit diagram schematically illustrating a configuration of a hydraulic circuit in the vehicle driving apparatus according to the embodiment of the present invention.

FIG. 2 is a hydraulic circuit diagram schematically illustrating a configuration of a hydraulic circuit 50 in the vehicle driving apparatus 100 of this embodiment. As illustrated in FIG. 2, the first and second motor generators 2 and 3 are connected to both the first and second oil pumps 35 and 36. More specifically, the hydraulic circuit 50 is configured such that the discharge oil from the first oil pump 35 joins in the circuit from the second oil pump 36 to the first and second motor generators 2 and 3. Accordingly, the discharge oil from the first and second oil pumps 35 and 36 is supplied to the first and second motor generators 2 and 3 as a cooling oil, and the first and second motor generators 2 and 3 are cooled.

The hydraulic circuit 50 is configured such that the discharge oil from the first oil pump 35 joins in the circuit from the second oil pump 36 to a lubrication portion LP. The lubrication portion LP is a generic term for portions requiring lubrication, and for example, the differential mechanism 6 is included in the lubrication portion LP. Accordingly, the discharge oil from the first and second oil pumps 35 and 36 is supplied to the lubrication portion LP as a lubricating oil, and the lubrication portion LP is lubricated.

The control valve 9a is connected to the first oil pump 35. The control valve 9a is configured by an electromagnetic valve or an electromagnetic proportional valve that is switched by a command from the controller 5 (FIG. 1) and controls the flow of a hydraulic oil to the clutch mechanism 30. When the control valve 9a is switched to a first position (open position), the hydraulic oil from the first oil pump 35 is supplied to the clutch mechanism 30, and the clutch mechanism 30 is engaged. On the other hand, when the control valve 9a is switched to a second position (cutoff position), the flow of the hydraulic oil from the first oil pump 35 to the clutch mechanism 30 is cut off, and the clutch mechanism 30 is released.

Figure 3:
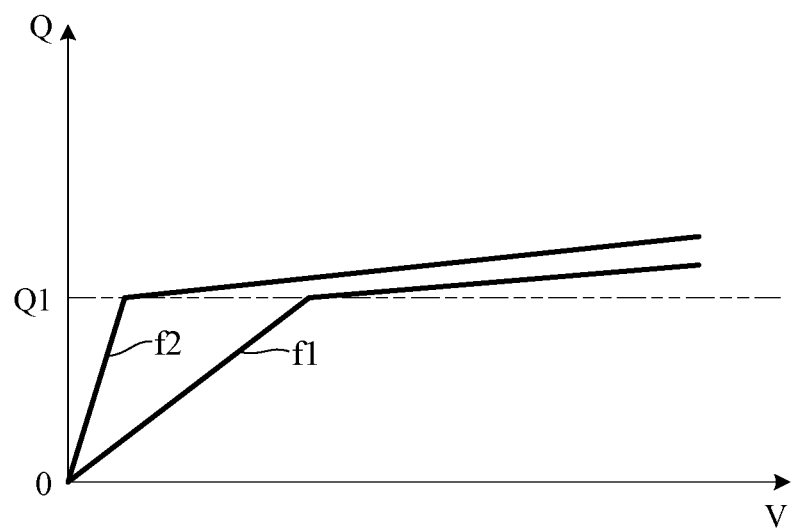
FIG. 3 is a diagram illustrating a relationship between a vehicle speed and a lubricating oil amount supplied to a lubrication portion in the hydraulic circuit diagram of FIG. 2.

FIG. 3 is a diagram illustrating a relationship between a vehicle speed V and a lubricating oil amount Q supplied to the lubrication portion LP (for example, the differential mechanism 6). A characteristic f1 in the drawing is a characteristic of the lubricating oil amount in the EV mode, and a characteristic f2 is a characteristic of the lubricating oil amount in the power generation mode and the cruising mode. As illustrated in FIG. 3, the lubricating oil amount Q increases with an increase in the vehicle speed V in any of the EV mode, the power generation mode, and the cruising mode. However, while the first oil pump 35 is driven in the power generation mode and the cruising mode, the first oil pump 35 is stopped in the EV mode. Therefore, the characteristic f2 is larger than the characteristic f1 in the ratio of increase in the lubricating oil amount Q (inclination of the characteristic). Incidentally, the ratio of increase in the lubricating oil amount Q is gentle with a predetermined lubricating oil amount Q1 as a boundary. The predetermined lubricating oil amount Q1 corresponds to a lubricating oil amount when a hydraulic pressure in the hydraulic circuit reaches a set pressure of a relief valve (not illustrated) provided in the hydraulic circuit 50.

In this manner, in the EV mode, the lubricating oil amount Q decreases more than in the power generation mode and the cruising mode. Therefore, the capacity of the second oil pump 36 is set such that the amount of lubricating oil required during normal traveling can be secured even in the EV mode. However, in a special situation where the drive wheel 101 slips, the amount of lubricating oil supplied to the differential mechanism 6 may be insufficient as described below.

Figure 4:
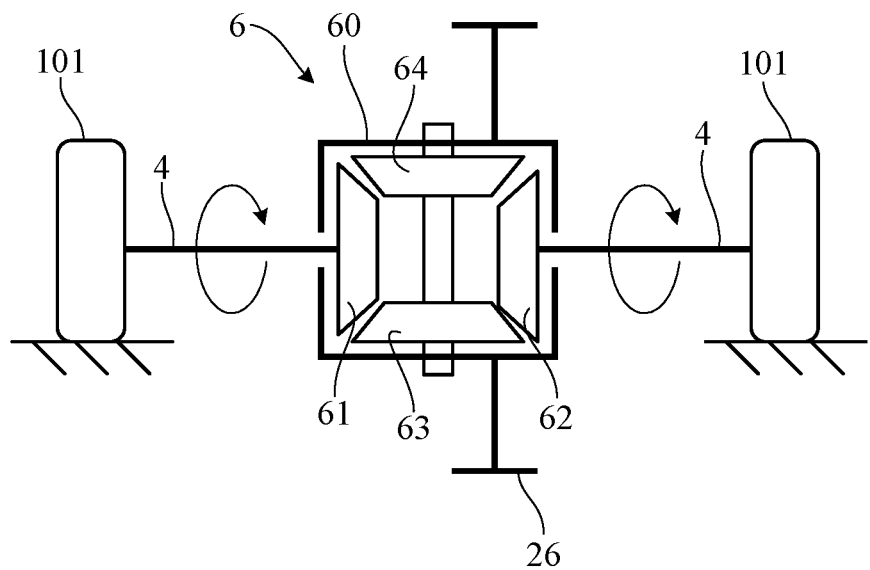
FIG. 4 is a diagram illustrating a schematic configuration of a differential mechanism.

FIG. 4 is a diagram illustrating a schematic configuration of the differential mechanism 6. As illustrated in FIG. 4, the differential mechanism 6 includes a pair of left and right side gears 61 and 62 and a pair of pinion gears 63 and 64 meshing with each of the side gears 61 and 62 arranged inside a differential case 60. The pair of left and right side gears 61 and 62 are respectively coupled to distal end portions of a pair of right and left axles 4 penetrating the differential case 60, and rotate integrally with the axles 4. The pair of pinion gears 63 and 64 is rotatably supported by a pinion shaft fixed to the differential case 60 and extending perpendicularly to the axle 4.

During normal straight traveling, there is no speed difference between the right and left drive wheels 101. Thus, the pinion gears 63 and 64 do not rotate, and the torque input via the gear 26 is transmitted to the axle 4 via the differential case 60, the pinion gears 63 and 64, and the side gears 61 and 62. On the other hand, when one of the drive wheels 101 slips (idles) due to traveling on a road surface with a low friction coefficient such as on snow or on ice, a rotation speed difference occurs between the left and right side gears 61 and 62, and the pinion gears 63 and 64 rotate. Therefore, the amount of generated heat of the pinion gears 63 and 64 increases, and there is a concern that the amount of lubricating oil supplied to the differential mechanism 6 becomes insufficient during EV traveling in which the first oil pump 35 is stopped.

When the pump capacity is increased by increasing the size of the second oil pump 36 in order to cope with such a shortage of the lubricating oil amount, the cost is increased, and further, a fuel consumption is reduced due to an increase in friction. Therefore, in this embodiment, the vehicle driving apparatus 100 is configured as follows such that a sufficient amount of lubricating oil is supplied to the lubrication portion LP even in a slip state without increasing the size of the second oil pump 36.

Figure 5:
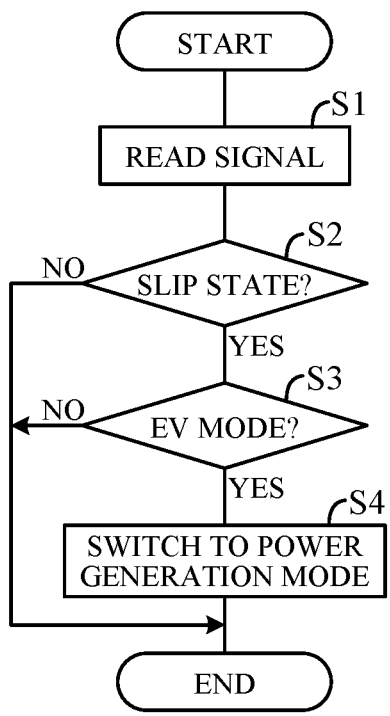
FIG. 5 is a flowchart showing an example of a processing performed by an ECU of FIG. 1.

FIG. 5 is a flowchart illustrating an example of a process executed by the controller 5 of FIG. 1 according to a predetermined program. The process illustrated in this flowchart is started, for example, when a power switch of the vehicle is turned on, and is repeated at a predetermined cycle. As illustrated in FIG. 5, first, in S1 (S: processing step), signals from the vehicle speed sensor 51, the accelerator opening sensor 52, the SOC sensor 53, and the rotation speed sensor 54 are read.

Next, in S2, whether the vehicle is in the slip state is determined on the basis of a signal from the rotation speed sensor 54. For example, the controller 5 calculates a rotation speed difference between the right and left drive wheels 101 detected by the rotation speed sensor 54, and determines that the vehicle is in the slip state when the rotation speed difference is equal to or more than a predetermined value. The acceleration of the vehicle may be calculated from the rotation speed sensor 54, and it may be determined that the vehicle is in the slip state when the acceleration is equal to or more than a predetermined value. When the determination result is positive in S2, the process proceeds to S3, and when the determination result is negative, the process ends.

In S3, it is determined whether a current traveling mode is the EV mode. When the current traveling mode is the power generation mode or the cruising mode, a negative determination is made in S3, and the process ends. That is, in this case, a sufficient amount of lubricating oil is supplied to the differential mechanism 6, and thus the process ends. On the other hand, when a positive determination is made in S3, the process proceeds to S4, and the traveling mode is switched to the power generation mode. Accordingly, the engine 1 is driven, and the first oil pump 35 is driven. Thus, the amount of lubricating oil supplied to the differential mechanism 6 increases, and the shortage of supply of the lubricating oil can be resolved.

According to this embodiment, the following functions and effects can be exerted.

(1) A vehicle driving apparatus 100 according to this embodiment includes: an engine (internal combustion engine) 1; a first motor generator 2 driven by the engine 1; a second motor generator 3; a gear mechanism 10 that transmits a driving force of the second motor generator 3 to a drive wheel 101 via a differential mechanism 6; a clutch mechanism 30 that is provided in the gear mechanism 10 and is switched between a clutch engagement state (first state) in which a driving force of the engine 1 is transmitted to the drive wheel 101 and a clutch release state (second state) in which the driving force is not transmitted; a controller (electronic control unit) 5 that controls each of the engine 1, the first motor generator 2, the second motor generator 3, and the clutch mechanism 30 and switches a traveling mode between an EV mode in which a vehicle travels while stopping driving of the engine 1 and a power generation mode or a cruising mode in which the vehicle travels while driving the engine 1; a first oil pump 35 driven by the engine 1; a second oil pump 36 connected to the differential mechanism 6; a hydraulic circuit 50 configured such that when the traveling mode is the EV mode, a lubricating oil is supplied from the second oil pump 36 to a lubrication portion LP requiring lubrication, and when the traveling mode is the power generation mode or the cruising mode, the lubricating oil is supplied from both the first oil pump 35 and the second oil pump 36 to the lubrication portion LP; and a rotation speed sensor 54 that detects a slip state of the drive wheel 101 (FIGS. 1 and 2). The lubrication portion LP includes the differential mechanism 6, and the controller 5 switches the traveling mode to the power generation mode when the slip state is detected by the rotation speed sensor 54 when the traveling mode is the EV mode (FIG. 5).

With this configuration, when the slip state of the drive wheel 101 is detected in the EV mode, the first oil pump 35 is driven, so that a sufficient amount of lubricating oil can be supplied from both the first oil pump 35 and the second oil pump 36 to the differential mechanism 6. Therefore, it is possible to prevent the differential mechanism 6 from being unable to rotate due to insufficient lubrication caused by excessive rotation of the pinion gears 63 and 64 without increasing the size of the second oil pump 36.

(2) The hydraulic circuit 50 is further configured such that a cooling oil is supplied from the first oil pump 35 and the second oil pump 36 to the first motor generator 2 and the second motor generator 3, and a clutch switching oil is supplied by the first oil pump 35 to the clutch mechanism 30 (FIG. 2). Accordingly, not only lubrication of the lubrication portion LP but also cooling and clutch switching of the motor generators 2 and 3 can be performed by the discharge oil from the oil pumps 35 and 36.

(3) The controller 5 determines that the vehicle is in the slip state when a rotation speed difference between the right and left drive wheels 101 detected by the rotation speed sensor 54 is equal to or more than a predetermined value. Therefore, it is possible to satisfactorily detect the slip state in which the insufficient supply of the lubricating oil occurs.

Incidentally, in the above embodiment, when the rotation speed difference detected by the sensor (rotation speed sensor) that detects the rotation speed difference between the right and left drive wheels 101 is equal to or more than the predetermined value, the controller as the determination unit determines that the vehicle is in the slip state. However, the configuration of a slip detector that detects the slip state of the drive wheels is not limited to the above configuration. In the above embodiment, the second oil pump 36 is connected to the differential mechanism 6 via the gears 26 and 29, and the second oil pump 36 is driven by the drive of the differential mechanism 6. However, the second oil pump may be connected to a portion other than the above-described portion as long as the second oil pump is connected to a path through which torque is transmitted from the second motor generator 3 to the drive wheel 101, that is, the first torque transmission path PA1 as the torque transmission portion.

In the above embodiment, when the slip state is detected by the slip detector when the traveling mode is the EV mode, the traveling mode is switched from the EV mode (first mode) to the power generation mode (second mode). However, the first mode and the second mode are not limited to the above-described configuration. That is, the first mode may be any mode as long as the mode is a mode in which the vehicle travels while stopping the driving of the internal combustion engine, and the second mode may be any mode as long as the mode is a mode in which the vehicle travels while driving the internal combustion engine.

In the above embodiment, the controller 5 controls the engine 1, the first and second motor generators 2 and 3, and the clutch mechanism 30 (control valve 9a) to switch the traveling mode. However, any aspect may be used as an aspect of switching the traveling mode as long as the mode can be switched between the first mode and the second mode. In the above embodiment, the hydraulic circuit 50 is configured such that the discharge oil of the first oil pump 35 is used as the cooling oil of the motor generators 2 and 3, the lubricating oil of the lubrication portion LP, and the hydraulic oil for clutch switching, and the discharge oil of the second oil pump 36 is used as the cooling oil of the motor generators 2 and 3 and the lubricating oil of the lubrication portion LP. However, the hydraulic circuit may have any configuration as long as the lubricating oil is supplied from the second oil pump to the lubrication portion when the traveling mode is the first mode, and the lubricating oil is supplied from both the first oil pump and the second oil pump to the lubrication portion when the traveling mode is the second mode.

The above embodiment can be combined as desired with one or more of the above modifications. The modifications can also be combined with one another.

According to the present invention, it is possible to prevent an amount of lubricant supplied to a lubrication portion from becoming insufficient.

Above, while the present invention has been described with reference to the preferred embodiments thereof, it will be understood, by those skilled in the art, that various changes and modifications may be made thereto without departing from the scope of the appended claims.

What is claimed is:

1. A vehicle driving apparatus, comprising:
   an internal combustion engine;
   a first motor generator driven by the internal combustion engine;
   a second motor generator;
   a torque transmission portion configured to form a torque transmission path so that a driving force of the second motor generator is transmitted to a drive wheel via a differential mechanism;
   an electronic control unit configured to control the internal combustion engine, the first motor generator and the second motor generator to switch a traveling mode to a first mode in which a vehicle travels while stopping the internal combustion engine or a second mode in which the vehicle travels while driving the internal combustion engine;
   a first oil pump driven by the internal combustion engine;
   a second oil pump connected to the torque transmission portion;
   a hydraulic circuit configured so that when the traveling mode is the first mode, a lubricating oil is supplied from the second oil pump to a lubrication portion requiring a lubrication, and when the traveling mode is the second mode, the lubricating oil is supplied from both the first oil pump and the second oil pump to the lubrication portion; and
   a slip detector configured to detect a slip state of the drive wheel, wherein
   the lubrication portion includes the differential mechanism,
   the electronic control unit is configured to switch the traveling mode to the second mode when the slip state is detected by the slip detector in the first mode,
   the slip detector includes a sensor configured to detect a rotation speed difference between a left drive wheel and a right drive wheel, and
   the electronic control unit is configured to determine that the vehicle is in the slip state when the rotation speed difference detected by the sensor is equal to or more than a predetermined value.

2. The vehicle driving apparatus according to claim 1, wherein
   the first mode is a mode in which the vehicle travels by the driving force of the second motor generator, and
   the second mode is a mode in which the vehicle travels by the driving force of the internal combustion engine or the vehicle travels by the driving force of the second motor generator while driving the first motor generator by the driving force of the internal combustion engine.

3. The vehicle driving apparatus according to claim 1, further comprising a clutch mechanism provided in the torque transmission portion to switch between a first state in which the driving force of the internal combustion engine is transmitted to the drive wheel and a second state in which the driving force of the internal combustion engine is not transmitted to the drive wheel, wherein
   the hydraulic circuit is further configured so that a cooling oil is supplied from the first oil pump and the second oil pump to the first motor generator and the second motor generator, and a clutch switching oil is supplied from the first oil pump to the clutch mechanism.

4. The vehicle driving apparatus according to claim 2, further comprising
   a clutch mechanism provided in the torque transmission portion to switch between a first state in which the driving force of the internal combustion engine is transmitted to the drive wheel and a second state in which the driving force of the internal combustion engine is not transmitted to the drive wheel, wherein
   the hydraulic circuit is further configured so that a cooling oil is supplied from the first oil pump and the second oil pump to the first motor generator and the second motor generator, and a clutch switching oil is supplied from the first oil pump to the clutch mechanism.

5. The vehicle driving apparatus according to claim 2, wherein
   the torque transmission path is a first torque transmission path,
   the torque transmission portion is further configured to form a second torque transmission path so that the driving force of the internal combustion engine is transmitted to the drive wheel via the differential mechanism,
   the vehicle driving apparatus further comprises a clutch mechanism provided in the torque transmission portion to switch between a first state in which the driving force of the internal combustion engine is transmitted to the drive wheel and a second state in which the driving force of the internal combustion engine is not transmitted to the drive wheel, and
   the torque transmission portion is configured to form the first torque transmission path when the clutch mechanism switches to the second state, and to form the second torque transmission path when the clutch mechanism switches to the first state.

6. The vehicle driving apparatus according to claim 5, wherein
   the hydraulic circuit is configured so that a clutch switching oil is supplied from the first oil pump to the clutch mechanism to switch the clutch mechanism from the second state to the first state, and the electronic control unit is further configured to control the clutch mechanism to switch to the second state when the traveling mode is the first mode, and to control the internal combustion engine, the first motor generator, the second motor generator and the clutch mechanism so as to switch the traveling mode to the second mode while switching the clutch mechanism to the second state when the slip state is detected by the slip detector during traveling in the first mode.

7. The vehicle driving apparatus according to claim 1, wherein the second oil pump is connected to the differential mechanism to be driven by a rotation of the differential mechanism.

8. A vehicle driving apparatus, comprising:

an internal combustion engine;

a first motor generator driven by the internal combustion engine;

a second motor generator;

a torque transmission portion configured to form a torque transmission path so that a driving force of the second motor generator is transmitted to a drive wheel via a differential mechanism;

an electronic control unit configured to control the internal combustion engine, the first motor generator and the second motor generator to switch a traveling mode to a first mode in which a vehicle travels while stopping the internal combustion engine or a second mode in which the vehicle travels while driving the internal combustion engine;

a first oil pump driven by the internal combustion engine;

a second oil pump connected to the torque transmission portion;

a hydraulic circuit configured so that when the traveling mode is the first mode, a lubricating oil is supplied from the second oil pump to a lubrication portion requiring a lubrication, and when the traveling mode is the second mode, the lubricating oil is supplied from both the first oil pump and the second oil pump to the lubrication portion;

a slip detector configured to detect a slip state of the drive wheel; and a clutch mechanism provided in the torque transmission portion to switch between a first state in which the driving force of the internal combustion engine is transmitted to the drive wheel and a second state in which the driving force of the internal combustion engine is not transmitted to the drive wheel, wherein the lubrication portion includes the differential mechanism, the electronic control unit is configured to switch the traveling mode to the second mode when the slip state is detected by the slip detector in the first mode, and the hydraulic circuit is further configured so that a cooling oil is supplied from the first oil pump and the second oil pump to the first motor generator and the second motor generator, and a clutch switching oil is supplied from the first oil pump to the clutch mechanism.

9. A vehicle driving apparatus, comprising:

an internal combustion engine;

a first motor generator driven by the internal combustion engine;

a second motor generator;

a torque transmission portion configured to form a torque transmission path so that a driving force of the second motor generator is transmitted to a drive wheel via a differential mechanism;

an electronic control unit configured to control the internal combustion engine, the first motor generator and the second motor generator to switch a traveling mode to a first mode in which a vehicle travels while stopping the internal combustion engine or a second mode in which the vehicle travels while driving the internal combustion engine;

a first oil pump driven by the internal combustion engine;

a second oil pump connected to the torque transmission portion;

a hydraulic circuit configured so that when the traveling mode is the first mode, a lubricating oil is supplied from the second oil pump to a lubrication portion requiring a lubrication, and when the traveling mode is the second mode, the lubricating oil is supplied from both the first oil pump and the second oil pump to the lubrication portion; and a slip detector configured to detect a slip state of the drive wheel, wherein the lubrication portion includes the differential mechanism, the electronic control unit is configured to switch the traveling mode to the second mode when the slip state is detected by the slip detector in the first mode, the first mode is a mode in which the vehicle travels by the driving force of the second motor generator, the second mode is a mode in which the vehicle travels by the driving force of the internal combustion engine or the vehicle travels by the driving force of the second motor generator while driving the first motor generator by the driving force of the internal combustion engine, the torque transmission path is a first torque transmission path, the torque transmission portion is further configured to form a second torque transmission path so that the driving force of the internal combustion engine is transmitted to the drive wheel via the differential mechanism, the vehicle driving apparatus further comprises a clutch mechanism provided in the torque transmission portion to switch between a first state in which the driving force of the internal combustion engine is transmitted to the drive wheel and a second state in which the driving force of the internal combustion engine is not transmitted to the drive wheel, and the torque transmission portion is configured to form the first torque transmission path when the clutch mechanism switches to the second state, and to form the second torque transmission path when the clutch mechanism switches to the first state.

* * * * *